United States Patent [19]

Rocchetti

[11] Patent Number: 4,841,915

[45] Date of Patent: Jun. 27, 1989

[54] SPACE AGE DOG AND CAT COLLAR

[76] Inventor: Frankie Rocchetti, P.O. Box 195 Main St., Crumpler, W. Va. 24825

[21] Appl. No.: 121,869

[22] Filed: Nov. 17, 1987

[51] Int. Cl.$^4$ .......................................... A01K 27/00
[52] U.S. Cl. ..................................... 119/106; 119/96
[58] Field of Search .................... 119/106, 96; 54/24; 24/164, 172, 182, 197

[56] References Cited

U.S. PATENT DOCUMENTS

| 401,922 | 4/1889 | Barnard | 54/24 |
|---|---|---|---|
| 770,070 | 3/1904 | Johnson | 119/106 |
| 2,349,713 | 5/1944 | Finch | 119/106 |
| 2,614,533 | 10/1952 | Elsinger | 119/106 |
| 4,376,366 | 3/1983 | Miller | 119/106 X |

Primary Examiner—Gene Mancene
Assistant Examiner—R. Thomas Price
Attorney, Agent, or Firm—Cushman, Darby & Cushman

[57] ABSTRACT

A collar which has the comfort and fit of typical adjustable collars and yet is tightenable under tension and releasable when tension is released so as to provide obedience and control typical of choke collars. The collar includes first and second straps and first and second side mounted side brackets. The first strap is attached at each end thereof to one end of each side bracket and is adapted to extend across the forward portion of the animal's throat. The second strap is attached at a first end to the first side bracket and extends about the rear of the throat of the animal, through the second bracket, across the first strap, again through the first bracket to terminate at a second end thereof in an attachment to the second bracket. A rearwardly directed force on the outermost rear portion of the second strap initiates a sliding of the second strap relative to the first and second brackets and the first strap so as to reduce the diameter of the throat receiving opening defined by the collar structure. Likewise, release of tension enables the collar to again loosen to a comfortable fit about the animal's neck.

19 Claims, 4 Drawing Sheets

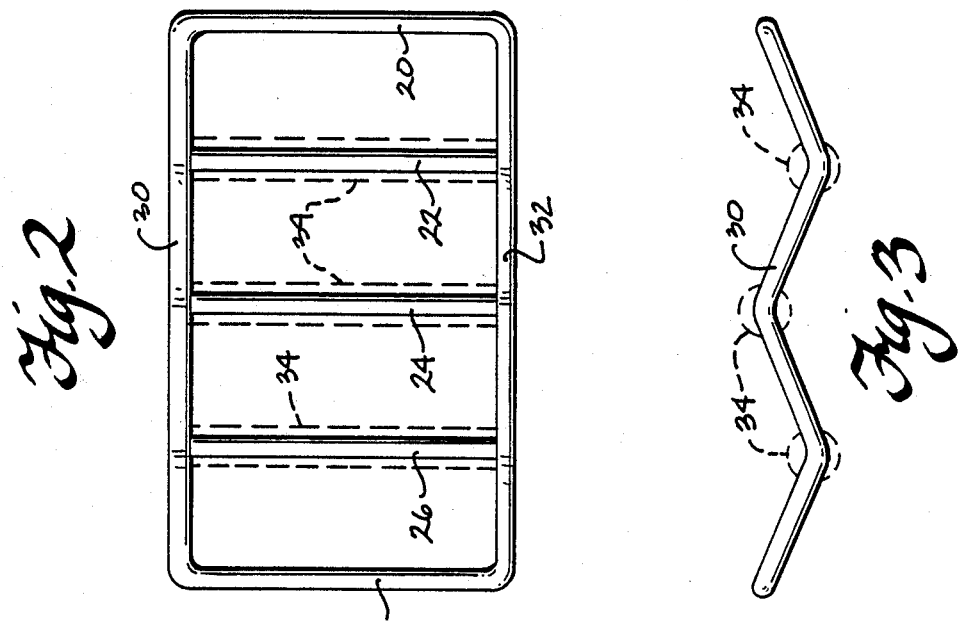
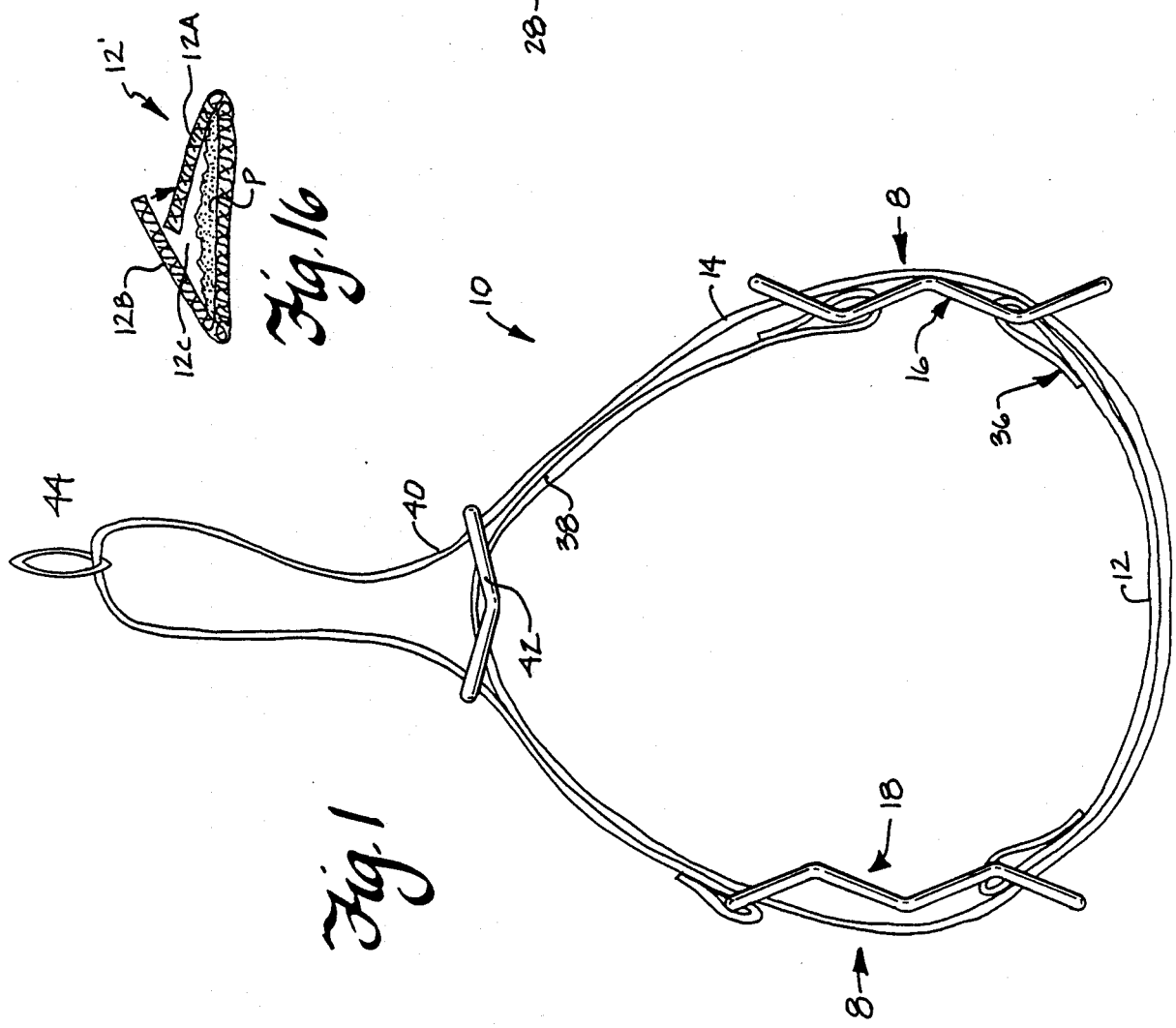

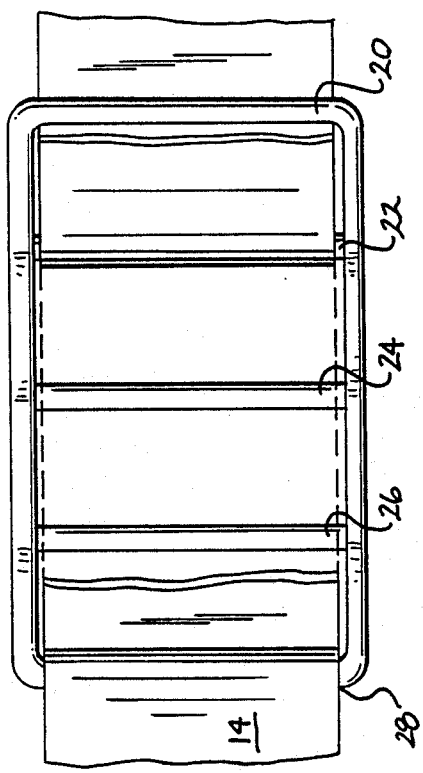
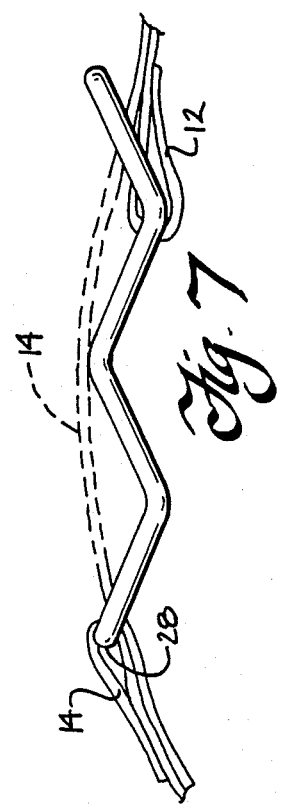
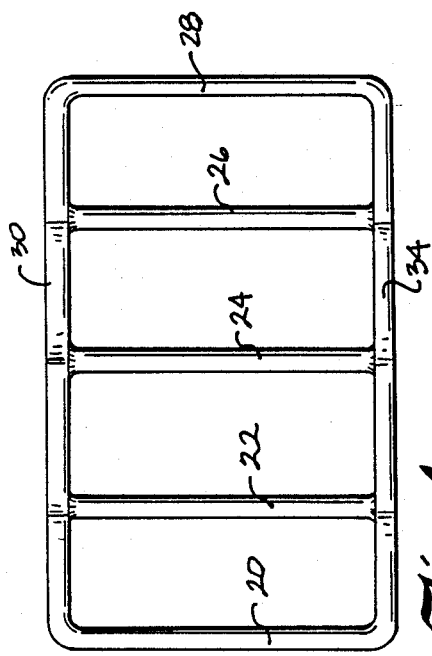
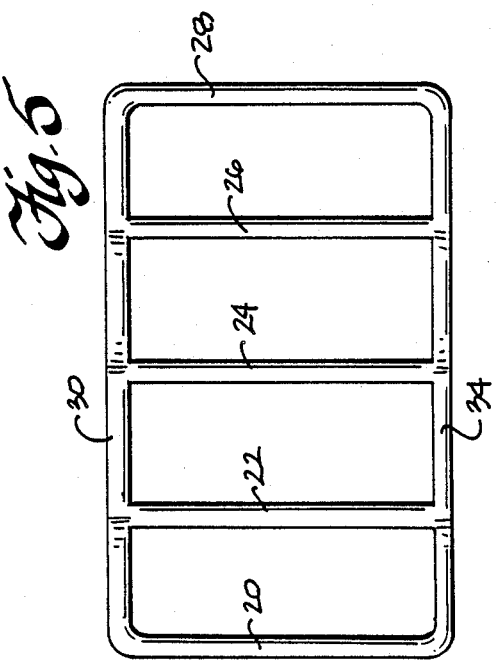

4,841,915

1

SPACE AGE DOG AND CAT COLLAR

BACKGROUND OF THE INVENTION

The present invention relates to collars and harnesses and, more particularly, to a choker-type collar for animals such as dogs and cats, head harnesses for horses, cows and the like, and body harnesses for dogs, cats or other small animals.

Heretofore animals have typically been restrained through the use of adjutable collars or harnesses which are adjusted to fit the animal and then fastened, for example, with a buckle. "Choke collars" are also used to restrain as well as train animals and are usually in the form of chains with one end thereof fed through a loop provided at the opposite end of the chain so that when the animal wearing the collar pulls away from a desired direction of travel or from a desired place, the collar will tighten about the animal's throat as a slip knot discouraging the animal from such undesirable behavior.

These types of adjustable collars are advantageous in that they tend to be relatively wide and, thus, comfortably fit about the animal's neck. However, these collars lack the obedience/control characteristic of choke collars. On the other hand, the typical chain choke collars, because one end is fed through a loop at the other end, slide across the front and sides of the majority of the animal's neck during the tightening process and can pinch its fur and skin at the site of the loop. Such choke collars also unevenly tug on the animal's neck tending to pull him in one direction irrespective of whether such movement is desired. Further, the chain can become stuck in the tightened position if the links wedge against or in the loop and the animal's master must manually release it. Finally, once tension on the collar is removed and if the links do not catch on the loop, it can become too loose for the particular animal and he may slip out of the collar itself.

It would, therefore, be desirable to provide a collar which can advantageously provide the comfort and fit of typical adjustable collars and yet be tightenable under tension and releasable when tension is released so as to include the obedience/control characteristics of the choke collar.

It would further be desirable to provide such a collar wherein the tightening of the collar does not disadvantageously pull the animal to the right or to the left, minimizes the likelihood of pinching of the animal's skin between the parts of the collar which move relative to one another and does not become so loose as to enable escape when tension is released.

Even further, it would be desirable to provide a collar which can be combined with one or more like collars to provide a harness structure for the heads of cattle or horses or for the chest and throat of small animals so that the collar is versatile and its use even for a particular animal can be varied in accordance with the particular immediate needs of the master.

SUMMARY OF THE INVENTION

These and other objects are provided in accordance with the present invention which includes a collar having first and second strap elements and at least first and second side-mounted slide brackets. The first strap is attached at each of its ends to one end of each of two side brackets and is adapted to extend across the delicate "adam's apple" portion of the animal's throat. One

2 end of a second strap is attached to one of the side brackets and is adapted to extend about the back of the neck of an animal, through the second side bracket, over the first strap, again to and through the first bracket and ultimately rearwardly of the animal's neck to terminate at the rear end of the second side bracket. In this manner, the first strap of the collar protects the animal's throat from pinching and slide "burning" during collar tightening and the side brackets not only provide interconnections for the first and second straps, but enable the second strap to be slidably mounted about the animal's neck for "choker" type control of the animal. More particularly, when the rearward portion of the second strap is pulled rearwardly, as for example, when an animal lunges in an undesired direction, the second strap will be pulled through the brackets to evenly circumferentially decrease the diameter defined by the first strap and the inner rear portion of the strap to provide a "choke hold" on the animal's throat. When the animal ceases its undesired movement, because tension will be released on the outer rear portion of the second strap, the strap is free to again pass through the side brackets and be loosened by the natural movement and shape of the animal's throat to a comfortable fit thereabout.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings, all of which form a part of this specification, wherein like reference numerals designate corresponding parts in the various figures.

BRIEF DESCRIPTION OF THE DRAWINGS

FIG. 1 is a top plan view of a choke collar formed in accordance with the present invention;

FIG. 2 is an elevational view of the side bracket of the collar of the present invention;

FIG. 3 is a top plan view of the bracket of FIG. 2;

FIG. 4 is a view illustrating one manner in which the side bracket of FIG. 2 can be formed;

FIG. 5 is a view illustrating another manner in which the side bracket of FIG. 2 can be formed;

FIG. 6 is an elevational view of a left or second side bracket of the invention as shown in FIG. 2 with the collar straps of the invention mounted thereto;

FIG. 7 is a bottom plan view of the bracket of FIG. 6;

FIG. 16 is a cross-sectional view showing an alternate embodiment of the first strap of the collar of the invention.

DETAILED DESCRIPTION OF THE PRESENTLY PREFERRED EXEMPLARY EMBODIMENT

Figure 8:
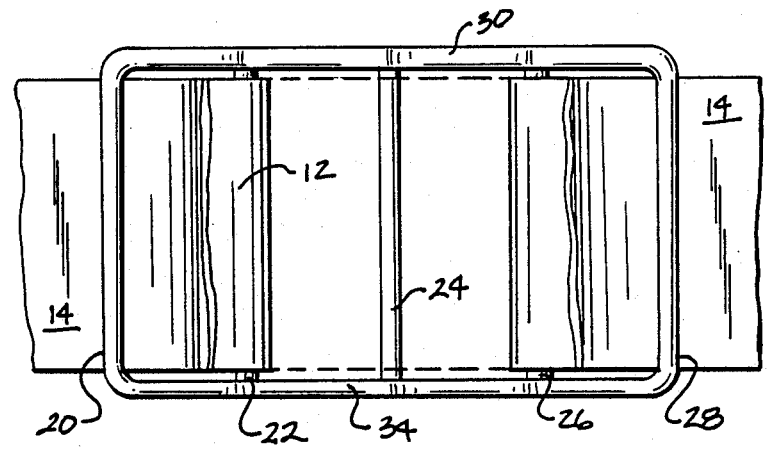
FIG. 8 is an elevational view of a right or first side bracket of the invention as shown in FIG. 2 with the collar straps of the present invention mounted thereto.

Referring to FIG. 1, the collar 10 of the present invention includes a first strap 12 and a second strap 14. Each of straps 12 and 14 are mounted at the ends thereof to side brackets 16, 18 so as to define a closed, circular space for receiving, for example an animal's throat. In the illustrated embodiment the first and second straps are woven nylon straps though it is to be understood that the most appropriate material depends upon the animal for which the collar is provided and the desired appearance and durability of the collar. Thus, the collar could be formed from leather, a chain, a string of beads or other desired natural, man made, or synthetic material, with or without a decorative surface.

For the purposes of the following discussion, the bracket illustrated on the right of FIG. 1 will be referred to as the "first bracket" and the bracket illustrated on the left of FIG. 1 will be referred to as the "second bracket". The first and second side brackets 16, 18 are identical in configuration and, as shown in FIGS. 2-5, preferably each include a number of cross-bars 20, 22, 24, 26, 28 which the first strap and the second strap of the collar are coupled to and fed through, as described more fully below. As can be seen, end cross-bars 20, 26 together with longitudinal members 30, 32 define a rectilinear bracket frame. As shown in FIG. 4, cross-bars 22, 24, 26 provided within the frame of the bracket can be welded to longitudinal members 30, 32 or, as shown in FIG. 5, the cross-bars 22, 24, 26 can be integrally formed with longitudinal members 30, 32. Thus, longitudinal members 30, 32 maintain the cross-bars in fixed, parallel relation.

As can be further seen in FIG. 2, in the preferred embodiment, the side brackets of the collar include rollers 34 (shown in phantom) mounted to cross-bars 22, 24, 26 so as to facilitate the quick tightening and the quick loosening of the collar about the animal's neck by enabling the free feed of the second strap relative to each of the brackets, as discussed more fully below. In this manner, it is ensured that the animal to which the collar has been mounted will not be "choked" by the collar after tension has been released from the second strap. Finally, each of the brackets preferably is in the form of a "W" as shown in FIG. 3, in particular, to further facilitate sliding of the second collar strap relative to each of the side brackets and to facilitate the attachment of the first and second straps thereto.

Figure 9:
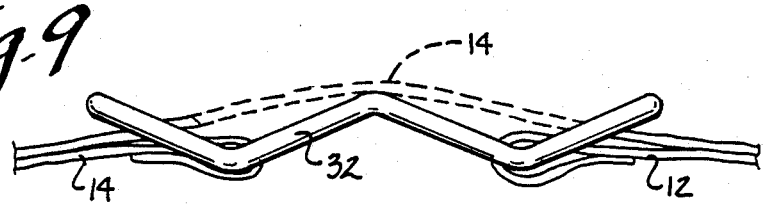
FIG. 9 is a bottom plan view of the bracket of FIG. 8.
Figure 10:
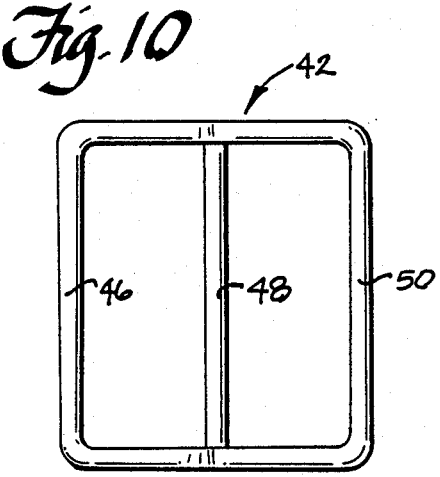
FIG. 10 is an elevational view of a rear bracket of a preferred embodiment of the invention.
Figure 12:
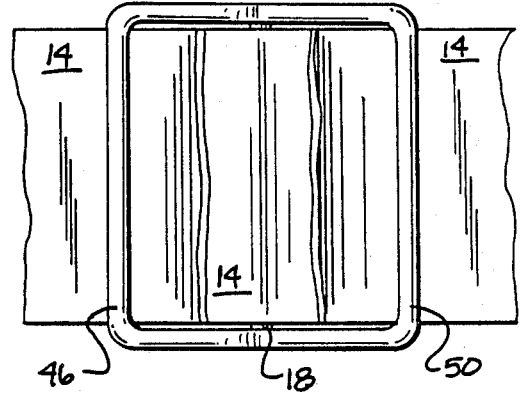
FIG. 12 is an elevational view of the bracket of FIG. 10 with collar straps mounted thereto.

The manner in which the straps 12, 14 are attached to the first bracket 16 is illustrated in FIGS. 8 and 9. The attachment of the first and second straps 12, 14 to the second bracket 18 is shown, in particular, in FIGS. 6 and 7. Thus, in the illustrated embodiment, referring to FIGS. 1 and 6-9, first strap 12 of collar 10 is attached to the forwardmost cross-bar 20 of first bracket 16 by looping the collar material thereabout and affixing it to itself as at 36 with a rivet, a suitable adhesive, by sewing, or the like. The second end of the first strap is similarly attached to the forward most cross-bar 20 of second bracket 18 as shown in FIGS. 1, 6 and 7.

Referring to FIG. 16, in accordance with an alternate embodiment, first strap 12 can be formed from a wider stip of material than that shown in FIGS. 1 and 6 and folded over to define first and second flaps, 12A and 12B which define a compartment 12C. A flea, tick, or lice powder or the like can be placed within compartment 12C to treat the animal wearing the collar and thus further add to the utility of the same.

As can be further seen, second strap 14 is mounted to the first and second bracket 16, 18 to provide the tightenable or choke characteristic of the collar and to provide the rear portion of the opening defined by the collar. More particularly, second strap 14 is mounted at a first end thereof to cross-bar 26 of bracket 16 and is extended from the first bracket 16 to the second bracket 18 where the material of the strap passes intermediate cross-bar 28 and cross-bar 26 of bracket 18 so as to be fed about the exterior of side bracket 18. In this manner, strap 14 defines an "inner" rear second strap portion 38, as will be described more fully below. The second strap is further passed through cross-bars 20 and 22 of bracket 18. Thus, strap 14 passes over the attachment of strap 12 to that bracket. The second strap further extends about the front of collar 10 again to first bracket 16 where it passes intermediate cross-bars 20 and 22 and passes over the attachment of the first strap 12 to this bracket. As with bracket 18, the strap passes over the intermediate cross-bars 22, 24, 26 of bracket 16 on the exterior thereof so as to minimize the sliding of the strap relative to the animal's fur and skin, as will become more apparent below. The strap 14 is then fed intermediate cross-bars 26 and 28 and is looped rearwardly. The second end of second strap 14 is attached in a fixed manner to cross-bar 28 of bracket 18. The second end of the second strap can be attached in any suitable manner as was the first strap.

As can be seen, the manner in which the second strap is attached forms a rearwardly extending enlarged loop which defines the "outer" rear second strap portion 40. Thus, the opening defined intermediate first strap 12 and inner rear second strap portion 38 can be enlarged by pushing rearwardly (upward in FIG. 1) on inner portion 38 to define a maximum size for the collar. Likewise, tension on outer rear second strap portion 40 pulls the same through first bracket 16 across the front of the collar over first strap 12 and through second bracket 18 so as to reduce the size of the rear inner second strap portion 38. This reduces the diameter of the opening for the animal's neck and tightens the collar about the neck of the animal.

As is apparent, in use, the release of tension on collar 10 will free second strap 14 so that the natural resistance of the animal's throat to such tension will urge the rear inner portion 38 rearwardly (upwardly in FIG. 1) so that the diameter of the collar about the neck is again enlarged so as to be comfortable for the animal. However, since second strap 14 is tortuously threaded through the first and second brackets, the enlargement of collar 10 is not so easy as to enable excessive loosening and, hence, escape by the animal.

Figure 11:
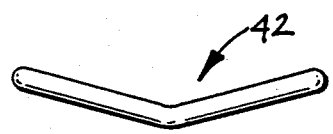
FIG. 11 is a top plan view of the bracket of FIG. 10.
Figure 13:
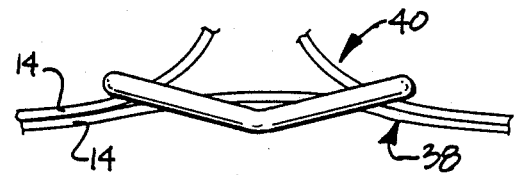
FIG. 13 is a top plan view of the bracket of FIG. 12.

As can be further seen in the illustrated embodiment and in particular in FIGS. 1 and 10-13, a rear bracket 42 is preferably mounted to second strap 14 so that the outer rear portion 40 is readily accessible and so that a leash attachment structure such as, for example, a metal ring 44 mounted thereto can be quickly located. Referring to FIG. 11, rear bracket 42 is preferably "V" shaped as seen from above or below to enable an easy slide mounting to second strap 14. Further, as shown in particular in FIGS. 12 and 13, the inner rear second strap portion 38 is fed over the middle cross-bar 48 of rear bracket 42 so as to permanently mount bracket 42 to collar 10. Further, the outer rear second strap portion 40 is fed intermediate the end cross-bars 46, 50 and cross-bar 48 so that a loop extends rearwardly of collar 10 as shown. As is apparent, rear bracket 42 not only facilitates location of the outer rear portion 40 of the second strap for leash attachment, but also ensures controlled, even tightening and loosening of collar 10 when tension is applied and removed, respectively, from second strap 14.

Figure 14:
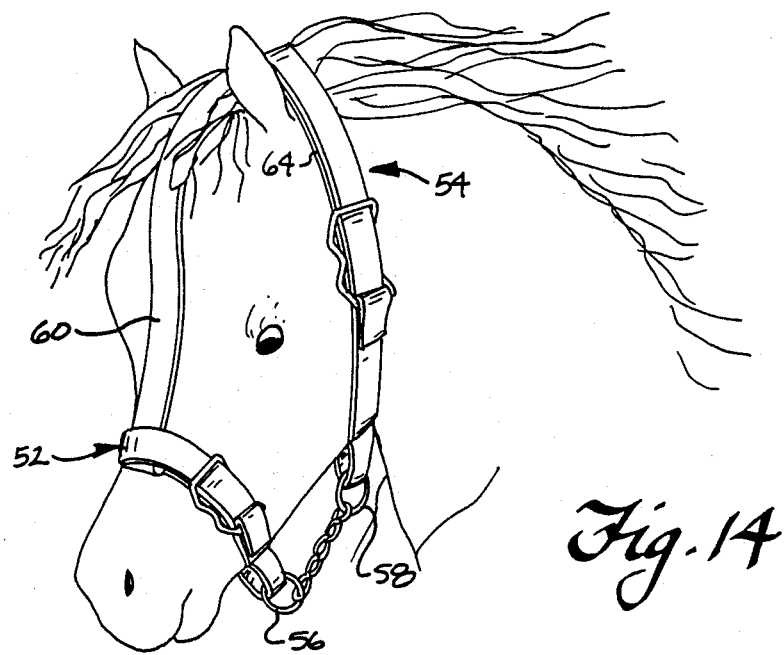
FIG. 14 is a perspective view showing two collars of the present invention used to form a harness.

Referring to FIG. 14, one collar 52 formed in accordance with the present invention can be mounted about the nose of a horse, cow or the like and a second collar 54 can be mounted behind the ears of the animal. The rings 56, 58 of the first and second collars 52, 54 can then te coupled to one another or to a lead so as to define a harness for the animal. When two collars are used in this manner, a further strap 60 is preferably connected to the first strap 62, 64 of each of the collars so that it passes between the eyes and between the ears of the animal when mounted thereto, to maintain the spacing of the collars relative to one another in the harness configuration. Further, either or both of straps 62, 64 can be folded to define a flea, tick or lice killing or repelling material compartment as shown in FIG. 16 and discussed above.

Similarly, where the harness is to be utilized for a small animal (not shown), for example, one collar can be mounted at the base of the neck of the animal with the first strap downwardmost and a second collar can be placed about the chest so that the first strap is downwardmost. The first strap of each of the collars is preferably interconnected by yet another strap and the rings of each of the collars can be connected to one another and/or to a leash or lead so that the collars can be used as a harness for such animal.

Figure 15:
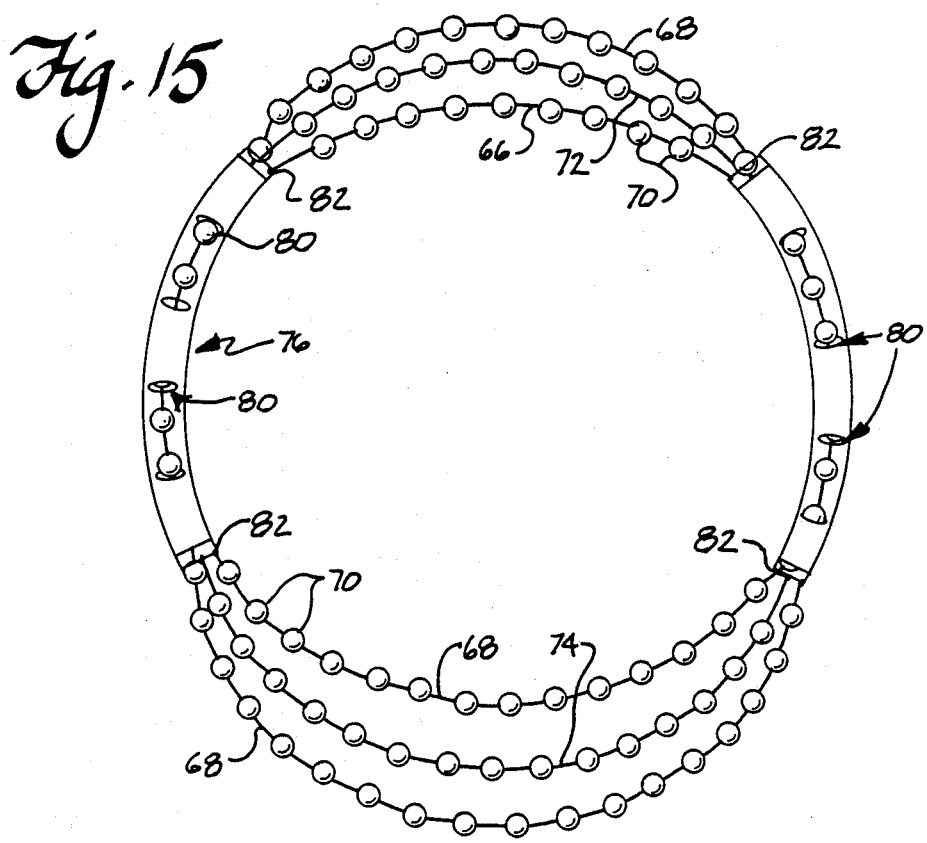
FIG. 15 is a top plan view of a choker type necklace formed in accordance with the present invention.

Referring to FIG. 15, it can be seen that the advantageous characteristics of the "strap" and "bracket" configuration of the invention can be ornamental as well as utilitarian and thus can be employed to make a necklace or a bracelet. In the illustrated embodiment, a choker-type necklace is formed by providing first and second "straps" 66, 68 that are strands of beads or pearls 70 though any suitable strap material can be used. Third and fourth straps 72 and 74 can also be provided and attached as strap 66 to enhance the appearance of the necklace.

While brackets of the type shown in FIG. 1 could be provided for straps 66 and 68, preferably, the brackets for the necklace embodiment are tubular members 76, 78 with intermediate openings 80 to allow tortuous threading of strap 68 therethrough and end brackets 82 to allow attachment of the strands 66, 68, 72 and 74 thereto. Thus, movement of beaded strap or strand 68 through the brackets 76, 78 is easier than movement of the same through a bracket as in FIG. 1, but the tortuous configuration of the path through openings 80 of tubular members 76, 78 limits the free movement of bead strand 68 so that the necklace will maintain a desired fitting about the wearer's neck. Tubular members 76, 78 can be formed from any suitable material such as, for example, plastic, wood or a metal such as gold or silver. Finally, a pendant or the like (not shown) can be mounted to the "outer rear portion" of second strap or strand 68.

While the invention has been described in connection with what is considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A collar comprising:
   a first strap;
   a second strap;
   first and second side bracket members each including at least forward, rearward and intermediate cross-bar elements and first and second longitudinal side elements interconnecting said cross-bar elements so as to maintain said cross-bar elements in spaced, parallel relation;
   said first strap being connected at a first end thereof to a first cross-bar element of the first side bracket member and being connected at a second end thereof to a cross-bar element of the second side bracket member, said second strap being connected at a first end thereof to another cross-bar of said first side bracket spaced from the first cross-bar element and being connected at a second end thereof to a second side bracket, said second strap being fed through said first and second brackets such that said second strap extends from said first bracket rearward to said second bracket to define an inner rear second strap portion, through said second bracket, across said first strap, through said first bracket, and rearwardly about said inner rear second strap portion to said second side bracket to thereby define an outer rear second strap portion whereby a circumferential throat receiving portion is defined by said first strap and said inner rear second strap portion which has a diameter which can be varied by pulling rearwardly on the outer rear second strap portion.

2. A collar as in claim 1, further comprising a rear bracket including at least three cross-bar members and first and second longitudinal side elements for interconnecting the cross-bar elements and maintaining said cross-bar elements in parallel space relation, said rear bracket being mounted such that the inner rear portion of said second strap is looped over a central cross-bar member and said outer rear second strap portion passes over said intermediate cross-bar member so as to define a loop extending rearwardly from said rear bracket.

3. A collar as in claim 2, further comprising a ring mounted to said rearwardly extending loop of said outer rear second strap portion for coupling the collar to a leash or the like.

4. A collar as in claim 1, further comprising elongated cylindrical roller elements mounted to at least said intermediate cross-bar elements of each of said first and second side bracket members for facilitating feed of said second strap through said first and second bracket members.

5. A collar as in claim 1, wherein said cross-bar elements of each said side bracket members are welded to said longitudinal side elements.

6. A collar as in claim 1, wherein said cross-bar elements of each said side bracket members are formed integrally with said longitudinal side elements.

7. A collar as in claim 1, wherein said first and second straps are formed from nylon material.

8. A collar as in claim 1, wherein said first strap is formed from a strip of material which has been longitudinally folded along each edge thereof so as to define two flaps and a central portion which define therebetween a compartment for receiving a flea, tick, and/or lice repelling material.

9. A harness comprising:
a first collar member comprising:
a first strap;
a second strap;
first and second side bracket members each including at least forward, rearward and intermediate cross-bar elements and first and second longitudinal side elements interconnecting said cross-bar elements so as to maintain said cross-bar elements in spaced parallel relation;
said first strap being connected at a first end thereof to a first cross-bar element of the first side bracket member and being connected at a second end thereof to a cross-bar element of the second side bracket member, said second strap being connected at a first end thereof to another cross-bar of said first side bracket spaced from the first cross-bar element and being connected at a second end thereof to said second side bracket, said second strap being fed through said first and second brackets such that said second strap extends from said first bracket rearward to said second bracket to define an inner rear second strap portion, through said second bracket, across said first strap, through said first bracket, and rearwardly about said inner rear second strap portion to said second side bracket to thereby define an outer rear second strap portion whereby a circumferential throat receiving portion is defined by said first strap and said inner rear second strap portion which has a diameter which can be varied by pulling rearwardly on the outer rear second strap portion;
a second collar member comprising:
a first strap;
a second strap;
first and second side bracket members each including at least forward, rearward and intermediate cross-bar elements and first and second longitudinal side elements interconnecting said cross-bar elements so as to maintain said cross-bar elements in spaced parallel relation;
said first strap being connected at a first end thereof to a first cross-bar element of the first side bracket member and being connected at a second end thereof to a cross-bar element of the second side bracket member, said second strap being connected at a first end thereof to another cross-bar of said first side bracket spaced from the first cross-bar element and being connected at a second end thereof to said second side bracket, said second strap being fed through said first and second brackets such that said second strap extends from said first bracket rearward to said second bracket to define an inner rear second strap portion, through said second bracket at least between two cross-bar elements thereof across said first strap, through at least two cross-bars of and rearwardly about said inner rear second strap portion to said second side bracket to thereby define an outer rear second strap portion whereby a circumferential throat receiving portion is defined by said first strap and said inner rear second strap portion which has a diameter which can be varied by pulling rearwardly on the outer rear second strap portion; and
a third strap element coupled at each end thereof to said first strap of first collar member and said first strap of said second collar member, respectively, so as to maintain said first and second collar member in spaced relation to one another.

10. A harness as in claim 9, wherein each said collar member further comprises a rear bracket including at least three cross-bar members and first and second longitudinal side elements for interconnecting said cross-bar elements and maintaining said cross-bar elements in parallel space relation, said rear bracket being mounted such that the inner rear portion of said second strap is looped over a central cross-bar member and said outer rear second strap portion passes over said intermediate cross-bar member so as to define a loop extending rearwardly from said rear bracket.

11. A harness as in claim 10, wherein each said collar member further includes a ring mounted to said rearwardly extending loop of said outer rear second strap portion for coupling the collar to a leash, a lead, or the like.

12. A harness as in claim 9, wherein each said collar member further includes elongated cylindrical roller elements mounted to at least said intermediate cross-bar elements of each of said first and second side bracket members for facilitating feed of said second strap through said first and second bracket members.

13. A harness as in claim 9, wherein said cross-bar elements of each said side bracket members are welded to said longitudinal side elements.

14. A harness as in claim 9, wherein said cross-bar elements of each said side bracket members are formed integrally with said longitudinal side elements.

15. A harness as in claim 9, wherein said first and second straps of each said collar members are formed from nylon material.

16. A harness as in claim 9, wherein at least one of said first straps said collar members is formed from a strip of material which has been longitudinally folded along each edge thereof so as to define two flaps and a central portion which define therebetween a compartment for receiving a flea, tick, and/or lice repelling material.

17. A necklace comprising:
a first strap member;
a second strap member;
first and second tubular side bracket members each including a forward end and a rearward end each of which have respective end openings, and a plurality of intermediate openings defined through the sidewall thereof, and first and second end bracket elements mounted to the forward and rearward ends, respectively, of each said first and second tubular side bracket members;
said first strap member being connected at a first end thereof to a first end bracket element of the first side bracket and being connected at a second end thereof to a first end bracket element of the second side bracket, said second strap being connected at a first end thereof to a second end bracket element of said first side bracket and being connected at a second end thereof to a second end bracket element of said second side bracket, said second strap being fed through said first and second brackets such that said second strap extends from said first bracket rearward to said second bracket to define an inner rear second strap portion, through said second bracket, across said first strap, through said first bracket, and rearwardly about said inner rear second strap portion to said second side bracket to thereby define an outer rear second strap portion whereby a circumferential throat receiving portion is defined by said first strap and said inner rear second strap portion which has a diameter which can be varied by pulling rearwardly on the outer rear second strap portion.

18. A necklace as in claim 17, further comprising a third strap member mounted intermediate said first end brackets of said first and second side brackets and a fourth strap member mounted intermediate said second end brackets of said first and second side brackets.

19. A necklace as in claim 17, wherein each of said strap members are strands of beads.

* * * * *